United States Patent
Levin et al.

(10) Patent No.: US 6,484,389 B1
(45) Date of Patent: *Nov. 26, 2002

(54) APPARATUS FOR PILOTLESS SELF-CENTERING INSTALLATION OF A STARTER-ALTERNATOR

(75) Inventors: Michael Benjamin Levin, Ann Arbor, MI (US); Ross Maxwell Stuntz, Birmingham, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,453

(22) Filed: Dec. 20, 1999

(51) Int. Cl.$^7$ .......................... H02K 15/02; H02K 15/00
(52) U.S. Cl. .............................. 29/598; 29/596; 29/732; 310/42; 310/67 R; 310/90; 310/91
(58) Field of Search ........................ 29/598, 596, 564.5, 29/33 L, 732; 310/42, 79, 90, 91, 67 R

(56) References Cited

U.S. PATENT DOCUMENTS

| | | | |
|---|---|---|---|
| 3,394,276 A | 7/1968 | Cafici | |
| 3,500,091 A | 3/1970 | Jones | |
| 3,762,042 A * | 10/1973 | Abe et al. ..................... | 29/598 |
| 4,554,472 A | 11/1985 | Kumatani | |
| 4,841,187 A | 6/1989 | Hauke et al. | |
| 4,862,009 A | 8/1989 | King | |
| 5,001,412 A | 3/1991 | Carter et al. | |
| 5,047,677 A | 9/1991 | Mineta et al. | |
| 5,163,528 A | 11/1992 | Kawamoto et al. | |
| 5,500,994 A * | 3/1996 | Itaya ............................ | 29/598 |
| 5,581,136 A | 12/1996 | Li | |
| 5,751,084 A * | 5/1998 | Park ............................. | 310/90 |
| 6,204,577 B1 * | 3/2001 | Chottiner et al. ............. | 310/42 |
| 6,247,223 B1 * | 6/2001 | Keck ............................ | 29/596 |

FOREIGN PATENT DOCUMENTS

| | | |
|---|---|---|
| JP | 63-198551 | 8/1988 |
| JP | 63-198553 | 8/1988 |
| JP | 4-168961 | 6/1992 |

* cited by examiner

Primary Examiner—Peter Vo
Assistant Examiner—Minh Trinh

(57) ABSTRACT

An installation and support apparatus or assembly 18 is provided for use in combination with an electric machine 10, such as a starter-alternator, which is adapted to be operatively installed between the engine block 12 and the transmission assembly 16 of a vehicle. The apparatus 18 includes a stationary support member or member 20, an inner or crankshaft engaging bearing 22, and an outer or rotor engaging bearing 24. Member 20 cooperates with bearings 22 and 24 to automatically create or form a relatively precise and uniform gap 54 between the stator assembly 26 and the rotor assembly 30 of electric machine 10, and further provides independent and additional support to the electric machine 10 and the vehicle's crankshaft 14.

14 Claims, 3 Drawing Sheets

APPARATUS FOR PILOTLESS SELF-CENTERING INSTALLATION OF A STARTER-ALTERNATOR

FIELD OF THE INVENTION

This invention relates to a method and an apparatus for pilotless self-centering installation of a starter-alternator, and more particularly, to a method and an apparatus for pilotless self-centering installation of a starter-alternator within a vehicle which automatically and precisely aligns the starter-alternator, and which provides independent and additional support to the starter-alternator and to the vehicle's crankshaft.

BACKGROUND OF THE INVENTION

Starter-alternators are electric machines which function as both motors and generators, and are employed within vehicles to provide electrical power and torque. Particularly, starter-alternators are typically used within hybrid-electric type vehicles, and provide a variety of functions and benefits, including but not limited to generating and providing electrical power to vehicle systems and components; starting the vehicle's engine; providing additional torque to the vehicle's engine during heavy accelerations; assisting in and/or performing the braking functions of the vehicle, thereby capturing the kinetic energy of the moving vehicle; and stopping or "shutting off" the vehicle's engine during idling and decelerating states or conditions, thereby improving the vehicle's overall fuel economy.

Starter-alternators typically reside in the space normally occupied by a flywheel and a clutch, in the case of manual transmission type vehicles, or by a torque converter, in the case of automatic transmission type vehicles. Starter-alternators generally include a stator, which is fixedly coupled to the engine block, and a rotor, which is coupled to the crankshaft, and which is rotatably disposed within and/or is concentric to the stator. Particularly, the rotor is concentrically disposed with respect to the stator, and is separated from the stator by a relatively uniform, precise and minute gap or space, across which magnetic flux is generated.

One drawback associated with this type of starter-alternator is that the relatively uniform, precise and minute gap between the stator and the rotor is relatively difficult to create and/or form during the installation and/or assembly of the starter-alternator. Another drawback associated with this type of starter-alternator is that the rotating rotor undesirably creates and/or generates radial forces and/or loads which are transferred to the vehicle's crankshaft. Particularly, the "overhung" mass of the rotor assembly is subject to and experiences what is known as the "flywheel whirl effect", which causes the rotor assembly to "tilt" and/or move "off center" as it rotates. The "tilt" and/or movement of the rotor assembly creates a local and/or non-uniform reduction in the relatively small and uniform gap between the stator and the rotor, thereby causing a reduction in the efficiency of the starter-alternator and a possibility of destructive contact occurring between the stator and the rotor. Furthermore, this "tilt" and/or movement undesirably generates a relatively high radial load or stress on the crankshaft, which can result in premature fatigue, fracture, and/or failure of the crankshaft.

Attempts have been made to maintain the precision and uniformity of the relatively small gap between the stator and the rotor, and to provide support to the rotor and the crankshaft. For example and without limitation, attempts have been made to align and/or center the rotor and the stator manually and/or by using manually operated devices or tools during the assembly and/or installation of the starter-alternator. However, these types of manual alignment procedures and tools are undesirably time-consuming and tedious to perform and/or employ. Additionally, such manual alignment procedures do not significantly reduce the stress which is transferred to the crankshaft by the substantially unsupported rotor. Other attempts have been made to tighten the specifications and/or tolerances of the components of the starter-alternator and/or of the crankshaft, and to machine and/or introduce precise pilots or piloting portions onto the components of the starter-alternator or onto the crankshaft. These prior attempts have undesirably and significantly increased the overall cost of the machining the crankshaft and/or the starter-alternator, and have not substantially reduced the stress imparted on the crankshaft.

There is therefore a need for a new and improved method and apparatus for installing a starter-alternator within a vehicle which overcomes many, if not all, of the previously delineated drawbacks of such prior methods and devices.

SUMMARY OF THE INVENTION

It is a first object of the invention to provide a method and an apparatus for installing a starter-alternator within a vehicle which overcomes at least some of the previously delineated drawbacks of prior devices, apparatuses, and methodologies.

It is a second object of the invention to provide a method and an apparatus for installing a starter-alternator within a vehicle which independently supports the rotor, thereby substantially reducing the stress transferred to the vehicle's crankshaft.

It is a third object of the invention to provide a method and an apparatus for installing a starter-alternator within a vehicle, which substantially eliminates the need for tedious manual alignment procedures and/or tools.

According to a first aspect of the present invention, an apparatus for supporting an electric machine within a vehicle is provided. The vehicle is of the type having an engine block and a crankshaft having a rear end which extends from the engine block. The electric machine includes a stator assembly and a rotor assembly. The rotor assembly is coupled to the rear end of the crankshaft, and which is separated from the stator assembly by a relatively precise and uniform gap. The apparatus includes a generally support member which is fixedly coupled to the engine block, the support member includes a first outer lip portion upon which the stator assembly is fixedly secured and an inner lip portion. A first bearing assembly is coupled to the inner lip portion and abuttingly engages the rear end of the crankshaft, thereby radially and rotatably supporting the crankshaft. A second bearing assembly is coupled to the inner lip portion and abuttingly engages the rotor assembly, thereby radially and rotatably supporting the rotor assembly and forming the relatively precise and uniform gap.

According to a second aspect of the present invention, a method of installing a electric machine within an apparatus is provided. The apparatus is of the type having an engine block and a crankshaft having an end which extends from the engine block. The electric machine include a stator assembly and a rotor assembly, the rotor assembly is adapted to be concentrically disposed within the stator assembly, and includes a first portion which is adapted to be coupled to the first end of the crankshaft. The method comprises the steps of:

providing a support member having an inner channel; coupling the stator assembly to the support member; providing a first and a second bearing assembly;

coupling the first and second bearing assemblies to the support member and within the channel; axially aligning the channel of the support member with the end of the crankshaft; moving the support member from a first position in which the support member is remote from the engine block and a second position in which the support member abuts the engine block, the movement being effective to cause the first bearing engage the end of the crankshaft, thereby automatically centering the first member and the stator assembly with respect to the crankshaft; axially aligning the rotor assembly with the end of the crankshaft; and moving the rotor assembly from a first position in which the support member is remote from the end portion of the crankshaft and a second position in which the support member abuts the end portion of the crankshaft, the movement being effective to cause the second bearing to engage the rotor assembly, thereby automatically centering the rotor assembly within the stator assembly.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
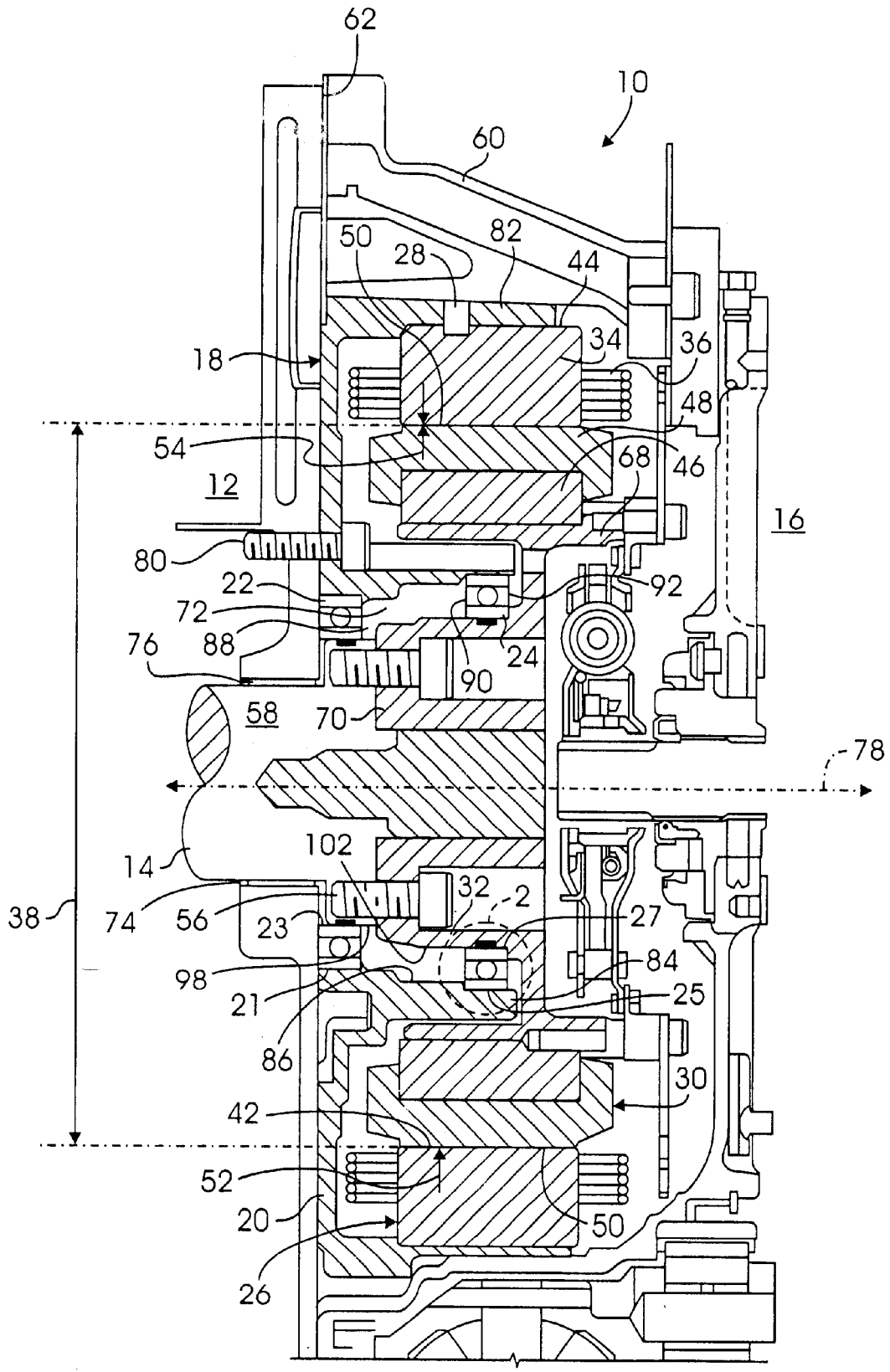
FIG. 1 is a sectional view of a starter-alternator assembly which is installed on a vehicle in accordance with the teachings of the preferred embodiment of the invention.
Figure 2:
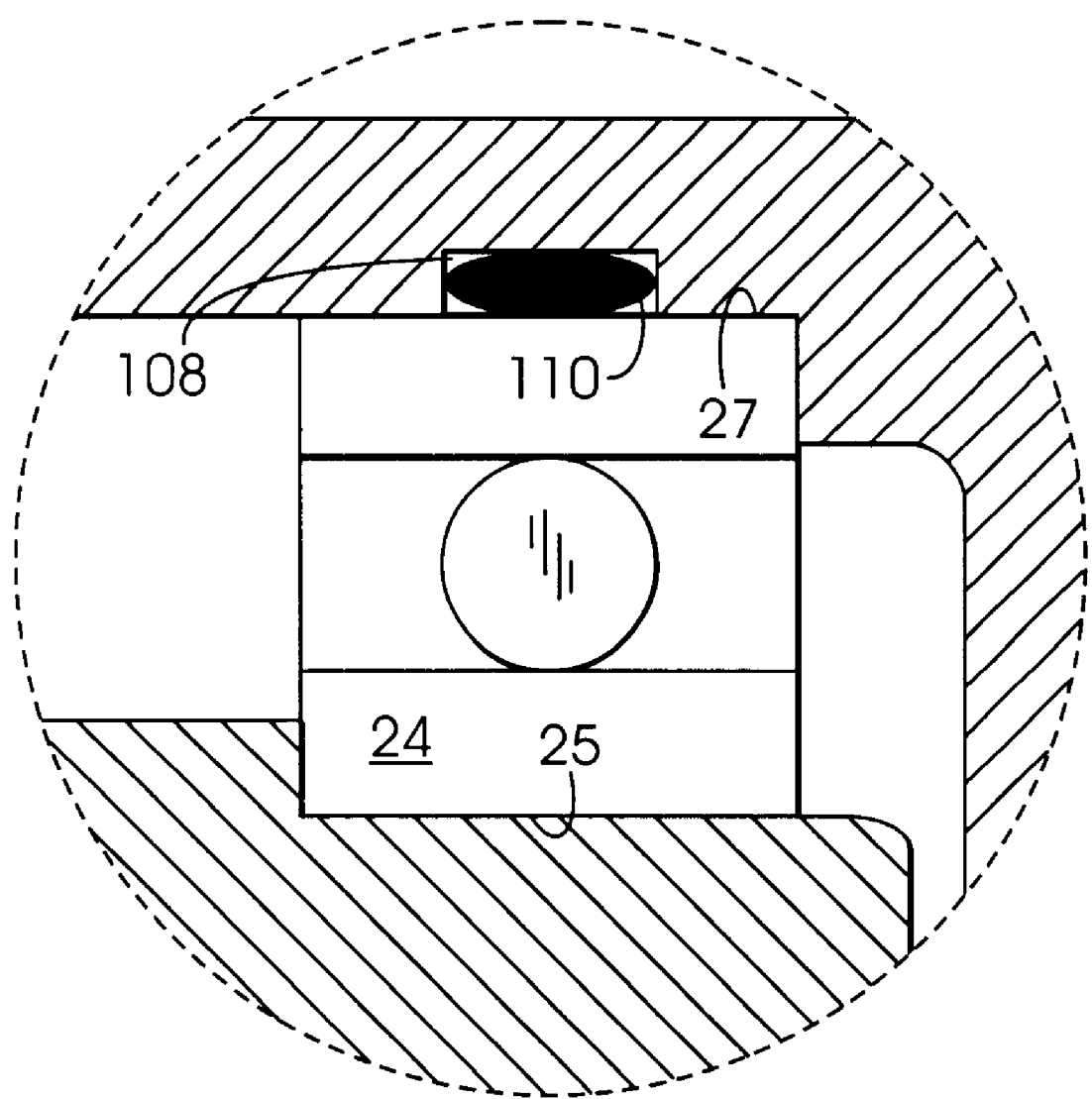
FIG. 2 is an enlarged partial view of the starter-alternator assembly shown in FIG. 1.

Referring now to FIGS. 1 and 2, there is shown an electric machine or assembly 10 which has been installed within a vehicle, in accordance with the teachings of the preferred embodiment of the present invention. Particularly, assembly 10 is installed within a vehicle of the type having a engine block 12, a crankshaft 14, which is conventionally, operatively, and rotatably disposed within the engine block, and a transmission assembly 16. In the preferred embodiment of the present invention, assembly 10 is operatively installed between the engine block 12 and the vehicle's transmission assembly 16. Assembly 10 has been coupled to and/or installed within the vehicle by way of a novel installation and support apparatus or assembly 18, which includes a stationary support member 20, an inner or crankshaft engaging bearing 22, and an outer or rotor engaging bearing 24. Assembly 10 and apparatus 18 are operatively disposed within a "bell-shaped" housing 60, which is conventionally and fixedly coupled to a wall or portion 62 of engine block 12. While the following discussion describes the use of apparatus 18 in combination with a vehicle, it should be appreciated that apparatus 18 may be operatively deployed upon and/or used in combination with any type of device or assembly in which an electric machine is operatively coupled to the crankshaft of an engine.

In the preferred embodiment of the invention, assembly 10 is a conventional starter-alternator or motor-generator and includes a stator assembly 26 which is conventionally, fixedly, and pressingly mounted to apparatus 18 by way of a plurality of substantially identical pins or rods 28, and a rotor assembly 30, which is rotatable with respect to stator assembly 26 and which includes a hub 32, which is fixedly connected to crankshaft 14. While the following description is made with reference to a starter-alternator, it should be appreciated that the installation method and apparatus described herein may be used in combination with any other type of electric machine which includes a stator and a rotor.

Stator assembly 26 includes a generally ring-shaped core member 34 and a winding 36, which is conventionally wrapped around and/or within core member 34. In the preferred embodiment of the invention, winding 36 is a conventional multi-phase winding, which gives rise to a conventional multi-phase alternating current. Stator assembly 26 has an inner annular surface 42 having a diameter 38, and an outer annular surface 44, which is coupled to member 20.

In the preferred embodiment, rotor 30 includes a plurality of peripherally disposed poles or pole pieces 46, and a conducting material 48, such as aluminum, which is peripherally disposed around and in between poles 46, thereby interconnecting poles 46. Rotor 30 has a generally cylindrical outer annular surface 50 having a diameter 52, which is slightly smaller than diameter 38 of stator assembly 26, and which is separated from the inner annular surface 42 of stator 26 by a relatively small and uniform distance or gap 54. In the one non-limiting embodiment of the invention, gap 54 is less than four tenths of a millimeter (0.4 mm) in length. As described more fully and completely below, this precise gap 54 is formed by support assembly 18 without tightening any of the machining tolerances of the components of the electric machine 10, and without the use of a pilot. It should be appreciated that this small, precise, and uniform gap 54 improves the overall electrical efficiency of the electric machine 10.

Hub 32 includes a generally cylindrical and integrally formed outer annular lip or ridge portion 68, on which poles 46 are fixedly and circumferentially coupled, and an integrally formed inner crankshaft connecting portion 70. Portion 70 is fixedly connected to end portion 58 of crankshaft 14 in a conventional manner, such as by a plurality of conventional bolt-type fasteners 56. A channel 108 is peripherally and integrally formed within the outer surface 102 of hub 32.

In one non-limiting embodiment, hub 32 is made from an aluminum material, having relatively high thermal expansion characteristics. In this non-limiting embodiment, hub 32 is given a smaller diameter than the preferred embodiment, thereby creating or forming a small "clearance" or gap between the outer surface 102 of portion 70 and the inner race 27 of bearing 24. During operation, hub 32 expands, thereby closing the small gap and allowing hub 32 to operatively engage the inner race 27 of bearing assembly 24.

The wall 62 of engine block 12 includes an integrally formed and generally circular aperture 74, through which end portion 58 of crankshaft 14 extends. A conventional rear bearing assembly 76 is operatively housed within aperture 74 and rotatably engages crankshaft 14. Rear bearing assembly 76 cooperates with several other substantially identical bearing assemblies (not shown), which are housed within engine block 12, to allow crankshaft 14 to rotate about its longitudinal axis 78, while concomitantly and substantially maintaining the position of axis 78 within aperture 74.

Support member 20 is preferably manufactured from a relatively strong, durable and rigid material, such as steel or aluminum, and is fixedly coupled to wall 62 in a conventional manner, such as by a plurality of conventional bolts or fasteners 80. Member 20 is generally cylindrical and/or ring-shaped, and includes an integrally formed outer annular lip or ridge portion 82, an inner annular lip or ridge portion 84, and a centrally disposed aperture or channel 88. Outer lip portion 82 is fixedly coupled to and supports stator assembly 26. The inner surface 86 of portion 84 forms the generally circular aperture or channel 88, in which end portion 58 of crankshaft 14 and portion 70 of hub 32 are rotatably disposed.

In the preferred embodiment of the invention, bearing assemblies 22 and 24 comprise conventional ball or needle bearing assemblies. Bearing assembly 22 is disposed between member 20 and end portion 58 of crankshaft 14. Particularly, the outer surface or race 21 is preferably press-fitted, or otherwise coupled to the inner annular surface 86 of member 20, and the inner surface or race 23 of assembly 22 abuttingly engages and/or mates with end portion 58, and is frictionally mated with portion 58 by way of a conventional o-ring 106, which is disposed within a channel 104, which is peripherally and integrally formed within the outer surface 98 of end portion 58. Bearing 22 allows crankshaft 14 to rotate with respect to member 20, while concomitantly supporting end portion 58 in its radial position with respect to engine block 12 (i.e., bearing 22 and member 20 cooperate to radially support end portion 58 and to maintain axis 78 in a substantially constant position with respect to aperture 76). In one non-limiting embodiment, bearing assembly 22 is press-fitted to end portion 58 of crankshaft 14, and is frictionally mated with surface 86 by way of an o-ring which is substantially identical to o-ring 106. In the preferred embodiment of the present invention, bearing assembly 22 is an "unsealed" or open bearing assembly, and is lubricated by way of engine oil which passes through aperture 76 and into bearing assembly 22. In one non-limiting embodiment, a separate channel (not shown) is integrally formed within engine block 12 and is effective to supply and/or return oil to/from channel 72, which is formed between the inner surface 86 of ridge 84 and the outer surface 102 of portion 70.

Bearing assembly 24 is operatively disposed between member 20 and portion 70 of hub 32. Particularly, the outer surface or race 25 of assembly 24 is preferably press-fitted, or otherwise coupled to the inner annular surface 86 of member 20, and the inner surface or race 27 abuttingly engages and/or mates with surface 102 of portion 70, and is frictionally engaged with portion 70 by way of o-ring 110. The frictional engagement between o-ring 110 and the inner race 27 of bearing 24 ensures that the inner race 27 rotates with hub 32. Bearing assembly 24 allows hub 32 and rotor assembly 30 to rotate with respect to member 20, while concomitantly supporting the rotating hub 32 and rotor assembly 30 in their respective radial positions relative to crankshaft 14 and engine block 12. In this manner, bearing 24 and member 20 cooperatively and substantially reduce and/or eliminate any radial deflection of rotor 30; substantially reduce the stress imparted on crankshaft 14; and substantially maintain or "Preserve" the relatively small and uniform gap 54.

In the preferred embodiment of the present invention, bearing assembly 24 is "open" or unsealed at its inner end 90, and is sealed at its outer end 92 in a conventional manner, such as by way of a radial lip seal or a diaphragm seal. In this manner, bearing assembly 24 is lubricated by way of engine oil and/or lubricant which passes through aperture 76, into the channel 72 and into bearing assembly 24 through the unsealed end 90 of assembly 24. Furthermore, the sealed end 92 of bearing assembly 24 retains the oil and/or lubricant within bearing assembly 24, thereby substantially preventing oil and/or lubricant from escaping into other portions or components of assembly 10. The press-fitted engagement abutting engagement between outer race 25 and surface 86 and the abutting and frictional engagement between o-ring 110 and inner race 27, substantially and cooperatively prevent oil from flowing "around" or past bearing assembly 24. It should be appreciated that the arrangement of bearing assemblies 22, 24 and the sealed end 92 of bearing assembly 24 cooperatively provide a "space-saving" feature within assembly 10, as the need for a separate oil seal to prevent oil from leaking from engine block 12 is eliminated. It should be further appreciated that allowing bearing assemblies 22, 24 to be lubricated by way of engine oil provides for better overall bearing performance, including improved speed and wear characteristics.

It should be noted that press-fitting the outer races 21, 25 of bearing assemblies 22, 24 to the stationary member 20 is preferred over press-fitting the inner races 23, 27 to portions 58, 70 (e.g., only one of the inner or outer races of each bearing assembly 22, 24 can be press-fitted during installation), due to the unbalanced loads and multi-directional forces imparted upon the bearing assemblies 22, 24. These unbalanced loads, which are produced by the bending of crankshaft 14 as a result of combustion and inertial forces, are transferred to the crankshaft end portion 58 and the rotor hub 32 and to bearing assemblies 22, 24. It has been found that bearing assemblies 22, 24 operate more efficiently when they are press-fitted to the stationary member (e.g., member 20), when the engaged rotating member(s) (e.g., portions 58 and 70) produce an unbalanced and/or multi-directional load.

In other alternate embodiments, different numbers and/or types of o-rings and bearing assemblies are used to seal and/or engage the various operatively coupled surfaces. In one non-limiting embodiment, bearing assemblies 22 and 24 are pre-lubricated and fully sealed bearing assemblies. In another non-limiting embodiment, bearing assemblies 22, 24 are not press-fitted to surface 86, but are rather respectively press-fitted to end portion 58 and hub 32.

The relatively minute and substantially uniform gap or distance 54 between stator 26 and rotor 30 is formed and is substantially preserved and/or maintained by way of the novel method of installing assembly 10 and the novel installation and support assembly 18. Particularly, assembly 10 is assembled and/or installed as follows. In the preferred embodiment of the invention, bearing assemblies 22, 24 are press-fitted or otherwise conventionally coupled to surface 86, as illustrated in FIG. 1. Stator assembly 26 is then fixedly coupled to support member 20 by way of pins 28.

Figure 3:
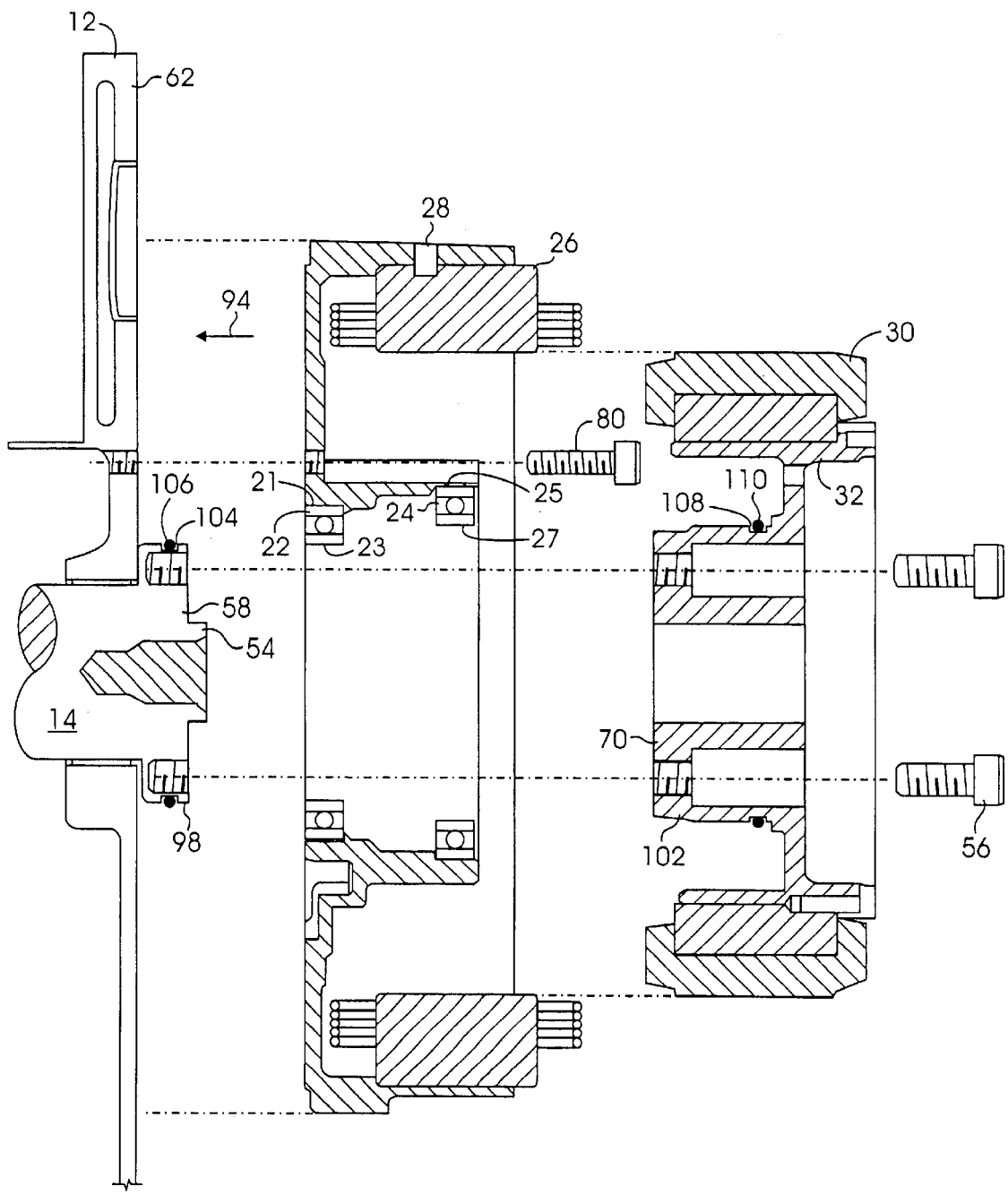
FIG. 3 is an exploded sectional view of the starter-alternator assembly shown in FIG. 1.

As best shown in FIG. 3, after bearing assemblies 22, 24 and stator assembly 26 have been attached to support member 20, support member 20 is substantially and axially "pre-aligned" with crankshaft 14, and is moved in the direction of arrow 94 into its operative position. Particularly, member 20 is moved in the direction of arrow 94 until it abuts wall 62 of engine block 12, as illustrated in FIG. 1. As support member 20 is moved into its operative position, the inner race 23 of bearing assembly 22 abuttingly engages and/or mates with end portion 58 of crankshaft 14, and more particularly, the inner race 23 abuttingly engages the outer diameter or outer annular surface 98 of end portion 58, thereby automatically guiding or piloting member 20 into its desired, operative, and radially centered position, and compressing o-ring 106. Once member 20 has been operatively positioned on wall 62, fasteners 80 are used to tightly and/or securely fasten member 20 to wall 62. In one non-limiting embodiment conventional gaskets are placed between member 20 and wall 62 before member 20 is coupled to wall 62. It should be appreciated that the presence of the bearing 22, which automatically pilots and/or guides member 20 into its operative and radially centered position, substantially eliminates the need to subsequently reposition and/or radially adjust member 20 during the installation procedure. It should be further appreciated that once member 20 is securely fastened to engine block 12, the abutting engagement between bearing 22 and end portion 58 provides substantial, additional, and radial support to crankshaft 14, and substantially reduces the stress imparted upon crankshaft 14.

Once member 20 has been coupled to wall 62, rotor assembly 30 is substantially and axially "pre-aligned" with end portion 58 of crankshaft 14, and is moved in the direction of arrow 94 into its operative position. Particularly, rotor assembly 30 is moved in the direction of arrow 94 until it abuts end portion 58 and is disposed within or is concentric to stator assembly 26, as illustrated in FIG. 1. As rotor assembly 30 is moved into its operative position, bearing assembly 24 abuttingly engages end portion 70 of hub 32, and more particularly, the inner annular surface or race 27 of bearing assembly 24 abuttingly engages the outer diameter or outer annular surface 102 of portion 70, thereby automatically guiding or piloting rotor assembly 30 into its operative, aligned, and radially centered position, and compressing o-ring 110. In this manner, member 20 and bearing assembly 24 cooperatively, automatically, and precisely ensure that relatively small and uniform gap 54 is formed between stator 26 and rotor 30. Once hub 32 has been operatively positioned, fasteners 56 are used to tightly and/or securely fasten hub 32 to end portion 58. In one non-limiting embodiment, a conventional gasket is placed between portion 70 and end portion 58.

It should be appreciated that the presence of the bearing 24, which automatically pilots and/or guides rotor assembly 30 into its operative, aligned, and radially centered position, substantially eliminates the need to manually align, reposition, and/or radially adjust rotor assembly 30, and eliminates the need to machine a pilot into any of the components of rotor assembly 30 for alignment with crankshaft 14. Particularly, bearing assemblies such as assemblies 22, 24, which are by nature extremely precise, allow for an extremely precise alignment between assembly 30 and crankshaft 14 without the need of a separated piloting device or portion. It should further be appreciated that the components of installation assembly 18 (i.e., member 20 and bearings 22, 24) cooperate to allow both the stator assembly 26 and the rotor assembly 30 to be "referenced" to or aligned with the same pilot diameter or surface 98 of end portion 58 of crankshaft 14. In this manner, the cooperative engagement of member 20, bearing assemblies 22, 24, stator assembly 26, rotor assembly 30 and crankshaft 14 ensures the highly precise alignment of stator 26 and rotor 30 and the formation of the relatively small and uniform gap 54.

In operation, crankshaft 14 provides and/or receives torque to/from rotor assembly 30, thereby causing crankshaft 14 and/or rotor assembly 30 to rotate. Particularly, crankshaft 14 selectively provides torque and/or rotation to rotor assembly 30 through hub 32, thereby generating electrical power and/or voltage with winding 36 and allowing assembly 10 to act as an alternator. Additionally, electrical power is conventionally and selectively supplied to and/or generated within winding 36 and is effective to generate a torque between stator assembly 26 and rotor assembly 30, thereby causing rotor assembly 30 to rotate and to assist in and/or cause the rotation of crankshaft 14. The installation and support assembly 18 ensures the efficient and unencumbered rotation and functional operation of crankshaft 14, stator assembly 26, and rotor assembly 30.

Importantly, the highly precise and uniform gap existing between stator assembly 26 and rotor assembly 30 is automatically created, preserved, and/or maintained by apparatus 18 without the use of a pilot or other alignment tool, thereby substantially reducing the machining costs required to install electric machine 10. Additionally, apparatus 18 allows the precise gap 54 to be formed without "tightening" any of the machining tolerances of the engine block 12, the crankshaft 14, or the electric machine 10. Moreover, the relatively small size and uniformity of gap 26 improves the overall efficiency of assembly 10. Furthermore, the support of electric machine 10 and crankshaft 14, which is cooperatively provided by bearing assemblies 22, 24 and member 20, substantially reduces the loads transferred to the crankshaft 14, thereby substantially preventing the stress-related fracture, failure, and/or deformation of the crankshaft 14. Additionally, the relatively and radially "tight" and abutting engagement or mating between bearings 22, 24, member 20, crankshaft 14, and rotor assembly 30 substantially eliminates "slop" and/or "rotor wobble", and the vibrational losses associated with the relatively "loose" dimensional fit of prior starter-alternator assemblies.

It is understood that the invention is not limited by the exact construction or method illustrated and described above, but that various changes and/or modifications may be made without departing from the spirit and/or the scope of the inventions.

What is claimed is:

1. An apparatus for supporting an electric machine within a vehicle of the type-having an engine block and a crankshaft having a first end which extends from said engine block, said electric machine including a stator assembly and a rotor assembly, said rotor assembly being coupled to said first end of said crankshaft and being separated from said stator assembly by a certain gap, said apparatus comprising:

a support member which is fixedly coupled to said engine block, which includes an outer lip portion upon which said stator assembly is fixedly secured, and which further includes an inner lip portion;

a first bearing assembly which is coupled to said inner lip portion and which abuttingly engages said first end of said crankshaft, thereby cooperating with said support member to radially and rotatably support said crankshaft; and a second bearing assembly which is coupled to said inner lip portion and which abuttingly engages said rotor assembly, thereby cooperating with said support member to radially and rotatably support said rotor assembly, while maintaining said certain gap.

2. The apparatus of claim 1 wherein said engine block includes an aperture and an amount of lubricating fluid which flows through said aperture, and wherein said second bearing assembly receives a portion of said lubricating fluid.

3. The apparatus of claim 2 wherein said second bearing includes a radial lip seal which operatively retains said portion of said lubricating fluid within said bearing assembly.

4. The apparatus of claim 1 wherein said first bearing is press-fitted to said inner lip portion.

5. The apparatus of claim 1 wherein said second bearing is press-fitted to said inner lip portion.

6. The apparatus of claim 1 wherein said gap is less than about 0.4 millimeters in length.

7. The apparatus of claim 1 wherein said first bearing assembly is press-fitted to said first end of said crankshaft.

8. The apparatus of claim 1 wherein said second bearing assembly is press-fitted to said rotor assembly.

9. The apparatus of claim 1 wherein said electric machine comprises a starter-alternator.

10. An apparatus for pilotless installation of an electric machine within an device of the type having an engine block and a crankshaft having a first end which extends from said engine block, said electric machine including a stator assembly and a rotor assembly, said rotor assembly being adapted to fit concentrically within said stator assembly and to be coupled to said first end of said crankshaft, said apparatus comprising:

a first member having a first portion upon which said stator assembly is fixedly secured and a second portion which forms a channel within the center of said first member, said first member being movable during said installation of said electric machine from a first position in which said first member is remote from said engine block to a second position in which said first member abuts said engine block and in which said first end of said crankshaft resides within said channel;

a first bearing assembly which is coupled to said second portion and which is disposed within said channel, said first bearing assembly being effective to receive and abuttingly mate with said crankshaft when said first member is moved to said second position, thereby automatically centering said first member and said stator assembly with respect to said crankshaft; and a second bearing assembly which is coupled to said inner ridge portion which is effective to receive and abuttingly mate with rotor assembly when said rotor assembly is coupled to said crankshaft, said second bearing assembly cooperating with said first member to axially align said rotor assembly within said stator assembly, thereby automatically centering said rotor assembly with respect to said stator assembly.

11. The apparatus of claim 10 wherein said first bearing assembly comprises a ball bearing assembly.

12. The apparatus of claim 10 wherein said second bearing assembly comprises a ball bearing assembly.

13. The apparatus of claim 10 wherein said first bearing assembly is press-fitted to said first ridge portion.

14. The apparatus of claim 10 wherein said electric machine comprises a starter-alternator.

* * * * *